United States Patent
Mukkamala et al.

(10) Patent No.: US 12,132,755 B2
(45) Date of Patent: Oct. 29, 2024

(54) SCORING APPLICATION VULNERABILITIES

(71) Applicant: RiskSense, Inc., South Jordan, UT (US)

(72) Inventors: Srinivas Mukkamala, Albuquerque, NM (US); Taylor Wong, Albuquerque, NM (US)

(73) Assignee: Ivanti, Inc., South Jordan, UT (US)

( * ) Notice: Subject to any disclaimer, the term of this patent is extended or adjusted under 35 U.S.C. 154(b) by 250 days.

(21) Appl. No.: 17/832,449

(22) Filed: Jun. 3, 2022

(65) Prior Publication Data

US 2022/0394055 A1 Dec. 8, 2022

Related U.S. Application Data

(60) Provisional application No. 63/196,535, filed on Jun. 3, 2021.

(51) Int. Cl.
*H04L 29/06* (2006.01)
*H04L 9/40* (2022.01)

(52) U.S. Cl.
CPC ............................. *H04L 63/1433* (2013.01)

(58) Field of Classification Search
None
See application file for complete search history.

(56) References Cited

U.S. PATENT DOCUMENTS

| 8,413,249 B1* | 4/2013 | Chou | G06F 11/00 |
| | | | 713/188 |
| 2020/0210590 A1* | 7/2020 | Doyle | G06F 8/77 |
| 2021/0392153 A1* | 12/2021 | Bubshait | H04L 63/1416 |

FOREIGN PATENT DOCUMENTS

WO WO-2019240604 A1 * 12/2019

* cited by examiner

*Primary Examiner* — Benjamin E Lanier (57) ABSTRACT

An embodiment includes a method of application vulnerability assessment and prioritization. The method includes ingesting modelling data from data sources for application vulnerabilities. The method includes transforming at least a portion of the modelling data to covariate vectors. The method includes extracting keywords and phrases from the modelling data and statistically measuring relevance of files of the modelling data based on the extracted keywords and phrases. The method includes generating threat levels of the application vulnerabilities based on the covariate vectors and the measured relevance. The method includes outputting the threat levels to a network management system. The method includes implementing, at a first endpoint device of the network, a first patch to address one of the application vulnerabilities.

20 Claims, 7 Drawing Sheets

SCORING APPLICATION VULNERABILITIES

CROSS-REFERENCE TO RELATED APPLICATION

This application claims priority to and the benefit of U.S. Provisional Application No. 63/196,535 filed Jun. 3, 2021, which is incorporated herein by reference in its entirety.

FIELD

Embodiments of the present invention relate to a method, apparatus, and computer software for quantifying risk as it relates to vulnerability management in application security.

BACKGROUND

Because some vulnerabilities reside in the application layer, resources are invested in reducing the attack surface and bolstering vulnerability management. Unfortunately, there is no clear and concise way to measure a software weakness's risk: the likelihood and impact, both technical and financial, will have on the application or business. Vulnerability scanners are often used by developers and security analysts to detect and remediate software weaknesses. Various scoring systems, including for example common vulnerability scoring system ("CVSS"), and taxonomies that include for example common weakness enumeration ("CWE"), attempt to quantify risk. However, there are significant discrepancies in terminology and a lack of consistency across all systems.

The National Institute of Standards and Technology ("NIST") has partnered with IBM to launch a new program in which IBM's Watson artificial intelligence system assigns scores for vulnerabilities. This is to help with the exponentially growing amount of vulnerability reports that NIST receives from vendors. A confidence percentage is calculated for each CVSS score the Watson system outputs and a human analyst reviews and edits the vulnerability results if the percentage is below the high nineties. This is just one example of organizations and agencies in the industry attempting to adapt and improve their assessment of vulnerabilities and the risk they pose.

With the increasing percentages of organizations affected by a successful cyberattack over the years, the inherent need for measuring risk becomes more apparent in order to effectively prioritize and manage software weaknesses. There is thus a present need for a method and apparatus which can score application vulnerabilities.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

SUMMARY

According to an embodiment of the invention, a method of application vulnerability assessment and prioritization may include ingesting modelling data from two or more data sources for a first application vulnerability and a second application vulnerability. The method may include transforming at least a portion of the modelling data to one or more covariate vectors representative of a parameter or a feature of the modelling data. The method may include extracting keywords and phrases from the modelling data. The method may include statistically measuring relevance of files of the modelling data based on the extracted keywords and phrases. The method may include generating a first threat level of the first application vulnerability and a second threat level of the second application vulnerability based on the covariate vectors and the measured relevance. The generating may include inputting the modelling data, the covariate vectors, and measured relevance into the statistical classification model, training at least a portion of the statistical classification model on the input to identify one or more features of the modelling data that indicate a threat level posed by the first and the second application vulnerability, and applying a mathematic model to classified modelling data to calculate a first derived threat level and a second derived threat level. In response to the first derived threat level differing from the second derived threat level by more than a threshold amount, the method may include outputting the first derived threat level as the first threat level and the second derived threat level as the second threat level to a network management system. In response to the first derived threat level being within the threshold amount of the second derived threat level, the method may include acquiring environmental data of a computer network implementing a software application affected by the software application vulnerability, analyzing the environmental data to derive one or more additional features; reclassifying the modelling data based on the one or more additional features to generate a first reclassified threat level and a second reclassified threat level; and outputting the first reclassified threat level as the first threat level and the second reclassified threat level as the second threat level to the network management system. The method may include causing display of the first threat level and the second threat level in the network management system to enable evaluation of the first application vulnerability and the second first application vulnerability. The method may include implementing a mitigation action such as a first patch to address the first application vulnerability.

A further aspect of an embodiment may include non-transitory computer-readable medium having encoded therein programming code executable by one or more processors to perform or control performance of one or more of the operations of the methods of application vulnerability assessment and prioritization described above.

An additional aspect of an embodiment may include compute device comprising one or more processors and a non-transitory computer-readable medium having encoded therein programming code executable by the one or more processors to perform or control performance of one or more of the operations of the methods of application vulnerability assessment and prioritization described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Embodiments of the present invention use modelling data such as software weaknesses, exploits, and compromised data along with one or more statistical modeling, text mining, and statistical classification programs combined with descriptive and inferential analysis to estimate the risk or threat levels of a software vulnerability.

An embodiment includes a method or system configured for application vulnerability assessment and prioritization. The method includes ingesting modelling data from data sources for application vulnerabilities. The method includes transforming at least a portion of the modelling data to covariate vectors. The method includes extracting keywords and phrases from the modelling data and statistically measuring relevance of files of the modelling data based on the extracted keywords and phrases. The method includes generating threat levels of the application vulnerabilities based on the covariate vectors and the measured relevance. The method includes outputting the threat levels to a network management system. The method includes implementing, at a first endpoint device of the network, a first patch to address one of the application vulnerabilities.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
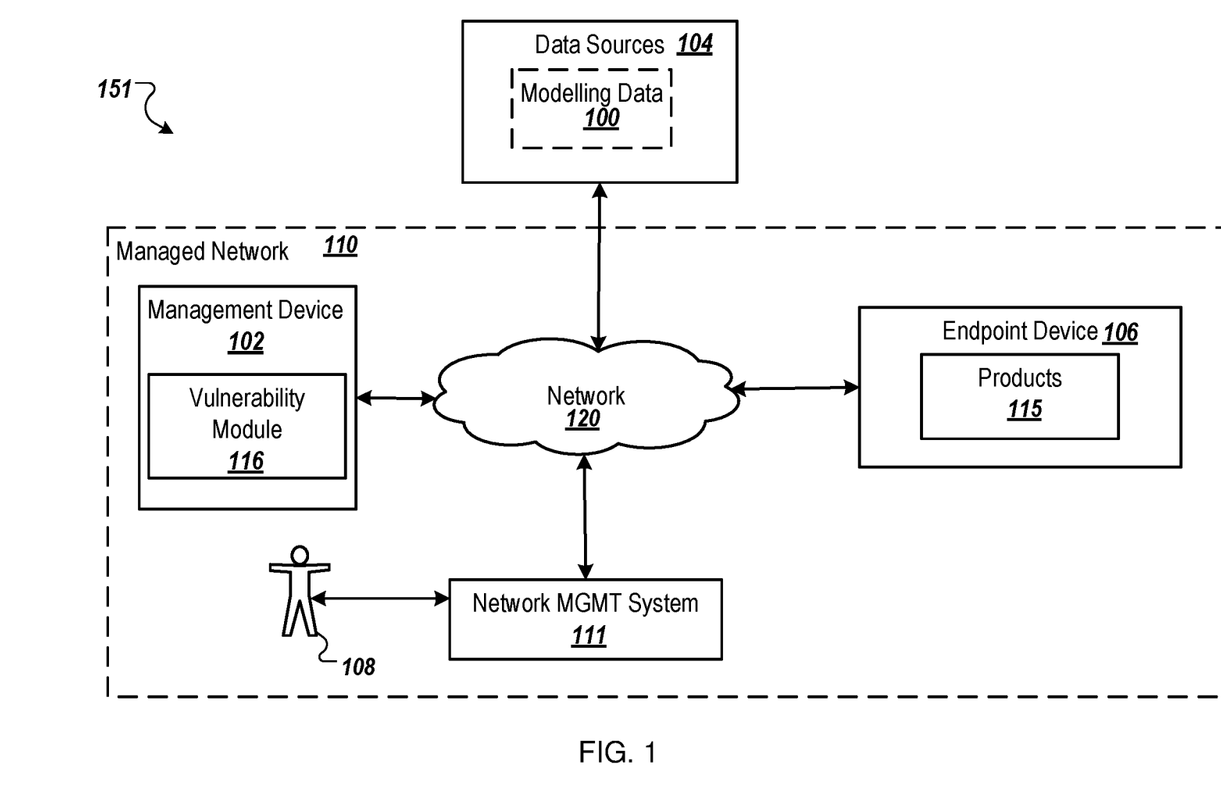
FIG. 1 depicts a block diagram of an example operating environment in which some embodiments described in the present disclosure may be implemented.

FIG. 1 is a block diagram of an example operating environment 151 in which some embodiments of the present invention can be implemented. The operating environment 151 may be configured for implementation of software application vulnerability assessment and prioritization (hereinafter, "vulnerability assessment"). The vulnerability assessment may be implemented in a managed network 110 based on modelling data 100 and/or environmental data from components of the managed network 110.

In the operating environment 151 of FIG. 1, a vulnerability module 116 of a management device 102 is configured to perform the vulnerability assessment using the modelling data 100 and/or environmental data. The vulnerability module 116 improves conventional software scanners. For example, the vulnerability module 116 is configured to generate threat levels of vulnerabilities based on a broad dataset that includes the modelling data 100 and the environmental data. The modelling data 100, which is described more elsewhere in the present disclosure, represents a wide range of information regarding the vulnerabilities. For example, the modelling data 100 might include software weakness data, exploit data, malware data, and compromised data, and other information related to vulnerabilities. In some embodiments, the modelling data 100 may be access or obtained using a scanner that is implemented in the vulnerability module 116.

Additionally, the vulnerability module 116 may perform a machine-learning based analysis of the modelling data 100 to generate a threat level of one or more vulnerabilities. The analysis may include a determination of covariates and features from the modelling data 100. The covariates and features are used to train machine-learning engines implemented in the vulnerability module 116. The vulnerability module 116 may according assess threat levels of the vulnerabilities and compare the threat levels, which may enable prioritization of mitigation actions implemented to address the vulnerabilities.

Additionally, in some embodiments one or more vulnerabilities may "tie," which may indicate that threat levels of two or more vulnerabilities are within a threshold amount of one another. In these and other circumstances, the vulnerability module 116 may perform an additional analysis based on environmental data that is relevant to the managed network 110 or an endpoint device 106 susceptible to the vulnerability. Accordingly, the vulnerability assessment may be performed using the environmental data which may reclassify the threat levels.

Accordingly, embodiments of the present disclosure represent an improvement to conventional vulnerability assessment. For instance, embodiments of the present disclosure provide an improve vulnerability assessment because it implements a broader dataset with improved assessment process based on covariates and features derived from the dataset.

The improved assessment process may also provide additional improvements to the managed network 110. For instance, the threat levels may enable prioritization of resources involved in mitigation of vulnerabilities and may automate mitigation actions in the managed network 110. In the operating environment 151, for example, a network management system 111 may receive data representative of threat levels of vulnerabilities related to products 115 on an endpoint device 106. The network management system might include a patch management system that distributes a patch to the endpoint device 106 responsive to the threat levels. Similarly, the network management system might include a service management system (e.g., ITSM system) that includes a ticketing system. The ITSM system may automatically generate a ticket that corresponds to a mitigation action that addresses a vulnerability responsive to receipt of the threat level. Accordingly, embodiments of the present disclosure provide a technical improvement to conventional network management systems.

Additionally, embodiments of the present disclosure are directed to a computer-centric problem and are implemented in a computer-centric environment. For instance, the embodiments of the present disclosure are directed to vulnerability assessment in the managed network 110 and other computer-device networks. Computing processes occurring in the operating environment 151 include communication and implementation of digital information and product updates (including software patches and code changes) on the products 115 loaded on the endpoint device 106. Communications during the processes described in this present disclosure involve the communication of data in electronic and optical forms via a network 120 and also involve the electrical and optical interpretation of the data and information.

Furthermore, the embodiments of the present disclosure address a technical issue that exists in a technical environment. The technical issue includes an inability of conventional vulnerability assessment systems to consistently assess vulnerabilities or to provide or adjust such assessments using contextual information. The technical problem is solved through a technical solution. For instance, the technical solution involves ingestion of the modelling data 100 along with environmental data and implementation of complex analytical tools to determine covariates and features of the dataset. These covariates and features train models implemented by the vulnerability module 116 to generate and prioritize the threat levels of vulnerabilities relevant to the managed network 110.

The operating environment 151 of FIG. 1 includes the managed network 110 and data sources 104. The managed network 110 includes the management device 102 that may communicate with the network management system 111 and the endpoint device 106, and the data source via the network 120. The components of the operating environment 151 are configured to communicate data and information via the network 120. Each of these components in the following paragraphs.

The network 120 may include any communication network configured for communication of signals between the components (e.g., 102, 111, 106, and 104) of the operating environment 151. The network 120 may be wired or wireless. The network 120 may have configurations including a star configuration, a token ring configuration, or another suitable configuration. Furthermore, the network 120 may include a local area network (LAN), a wide area network (WAN) (e.g., the Internet), and/or other interconnected data paths across which multiple devices may communicate. In some embodiments, the network 120 may include a peer-to-peer network. The network 120 may also be coupled to or include portions of a telecommunications network that may enable communication of data in a variety of different communication protocols.

In some embodiments, the network 120 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 120 may include data communicated via short messaging service (SMS), multimedia messaging service (MMS), hypertext transfer protocol (HTTP), direct data connection, wireless application protocol (WAP), or any other protocol that may be implemented in the components of the operating environment 151.

The data sources 104 includes one or more hardware-based computer devices or collection thereof that is configured to communicate with the other components of the operating environment 151 via the network 120. The data sources 104 are configured to provide access to one or more portions of the modelling data 100. As described with reference to FIG. 2, the modelling data 100 may include information pertaining to software application vulnerabilities. For instance, the data sources 104 may host a website on which the modelling data 100 are available. The data sources 104 may host or store the modelling data 100 such that information, metadata, and data related to the modelling data 100, which may be accessed via the network 120. For instance, the management device 102 may be configured to access the modelling data 100 via the network 120. In some embodiments, the management device 102 may be configured to include an application scanner that communicates an electronic message to the data sources 104 that accesses the modelling data 100.

The modelling data 100 may include text-based documents related to software application vulnerabilities and weaknesses. The modelling data 100 relate to a cybersecurity threat, a cybersecurity vulnerability, a software application code change, a patch, a hardware interface modification, or another update to one or more of the products 115. The modelling data 100 may be organized and/or include an identification number, an entry date, an entry summary, a links to product updates (e.g., a code change or patch), a threat severity, or some combination thereof related to a particular vulnerability.

An example of the data sources 104 may be Department of Homeland Security (DHS) server(s). In this example, the modelling data 100 may include lists of common vulnerabilities and exposures (CVEs) hosted by the DHS servers. Another example of the data sources 104 may be National Institute of Standards and Technology (NIST) servers. In this example, the update lists 117 may include national vulnerability database that is hosted by the NIST servers. The NIST server may host the information assurance vulnerability alerts (IAVAs), which may be an example of the modelling data 100. One with skill in the art may be familiar with other suitable examples of the data sources 104 and the modelling data 100. Some additional examples of the data sources 104 and the modelling data 100 are provided elsewhere in the present disclosure.

The managed network 110 includes the management device 102, the network management system 111 (in the Figures, "network MGMT system 111"), and the endpoint device 106. The managed network 110 is implemented to enable management of the endpoint device 106 by the management device 102 and/or the network management system 111. To implement the managed network 110, the endpoint device 106 may be enrolled. After the endpoint device 106 are enrolled, ongoing management of the endpoint device 106 may be implemented by the management device 102 and/or the network management system 111. The ongoing management may include overseeing and dictating at least a part of the operations at the endpoint device 106 as well as dictate or control product updates, service management operations, etc. implemented at the endpoint device 106.

The network management system 111 includes a hardware-based computing system that is configured to communicate with the management device 102 and the endpoint device 106 via the network 120. The network management system 111 is configured to provides some management functionality relative to the endpoint device 106. In some embodiments, the network management system 111 may include a patch management system (on-premises or cloud-based) that controls operations related to the product updates at the endpoint device 106. In general, management of the product updates may include determining which product updates pertain to the products, to determine which of the product updates to distribute to the endpoint device 106, and to distribute the product updates to the endpoint device 106 such that the product updates may be locally implemented. Implementation of the product updates at the endpoint device 106 include modification to computer code, programming code, or computer-executable instructions of a program that comprise the products 115. In the operating environment 151, the network management system 111 may receive threat levels from the management device 102, display them to an administrator 108, and implement one or more mitigation actions at the endpoint device 106 such as distribution of a patch to correct a vulnerability at the endpoint device 106.

Additionally or alternatively, the network management system 111 may include an ITSM system. The ITSM system may manage IT issues (e.g., technical deficiencies, network conductivities issues, etc.) at the endpoint device 106. The ITSM system can generate and implement tickets in the managed network 110. In the operating environment 151, the network management system 111 may receive threat levels from the management device 102, display them to an administrator 108, and implement one or more mitigation actions at the ITSM system such as automated generation of a ticket that is managed in the ITSM system.

Additionally still, the network management system 111 may include an endpoint management system such as an UEM system. In these and other embodiments, the network management system 111 may provide environmental data to the management device 102. For instance, the UEM system may have information related to the endpoint device 106 such as an inventory of the products 115, versions thereof, roles of users associated with the endpoint device 106, privileges of the endpoint device 106 in the managed network 110, and the like. The environmental data communicate by the UEM system may be used by the vulnerability module 116. For instance, the vulnerability module 116 may analyze the environmental data in generating threat levels of vulnerabilities that may apply to one or more of the products 115.

The network management system 111 may be associated with an administrator 108. The administrator 108 may be an individual, a set of individuals, or a system that interfaces with the network management system 111. In some embodiments, the administrator 108 may be able to view information displayed by the network management system 111 and provide input to the network management system 111. The information displayed on the network management system 111 may include data representative of the threat levels of software vulnerabilities and the input provided by the administrator 108 may form the basis of some computing processes performed by the network management system 111. For example, the administrator 108 may provide user input at a user interface associated with the network management system 111. The user input may indicate that the administrator 108 intends on publishing a subset of recommended product updates. The user input may take the form of a selection of an icon or button on the network management system 111.

The endpoint device 106 may include hardware-based computer systems that is configured to communicate with the other components of the operating environment 151 via the network 120. The endpoint device 106 may include any computer device that may be managed by the management device 102 and/or have been enrolled in the managed network 110. In some embodiments, the endpoint device 106 include devices that are operated by the personnel and systems of an enterprise or store data of the enterprise. The endpoint device 106 might include workstations of an enterprise, servers, data storage systems, printers, telephones, internet of things (IOT) devices, smart watches, sensors, automobiles, battery charging devices, scanner devices, etc. The endpoint device 106 may also include virtual machines, which may include a portion of a single processing unit or one or more portions of multiple processing units, which may be included in multiple machines. The endpoint device 106 may be referred to as managed endpoints when the endpoint device 106 are included in the managed network 110. The endpoint device 106 include the products 115. The products 115 may include applications of any kind or type. Some examples of the products 115 may include software applications, enterprise software, operating systems, and the like. The products 115 are subject to application vulnerabilities. The software vulnerabilities may include bugs, glitch, weakness, security flaw found in software or programming code of the products 115. The application vulnerabilities may be exploited by malicious actors (e.g., ransomware attackers or hackers) or may result in decreased performance of the product 115.

The management device 102 may include a hardware-based computer system that is configured to communicate with the other components of the operating environment 151 via the network 120. The management device 102 may include the vulnerability module 116. The vulnerability module 116 may be configured to perform application vulnerability assessment and prioritization. For instance, in some embodiments, the vulnerability module 116 may ingest the modelling data 100 from the data sources 104 for one or more application vulnerabilities that may affect or be relevant to the products 115. The vulnerability module 116 may transform at least a portion of the modelling data 100 to one or more covariate vectors. The covariate vectors may be representative of a parameter of the modelling data 100. The parameters might include an element or feature of the modelling data 100 such as a CVE, a symptom, an affected application, a type of mitigation, and the like. The vulnerability module 116 may extract keywords and phrases from the modelling data 100 and statistically measure relevance of files of the modelling data 100 based on the extracted keywords and phrases.

The vulnerability module 116 may generate a threat level for each of the application vulnerabilities based on the covariate vectors and the measured relevance. The vulnerability module 116 may input the modelling data 100, the covariate vectors, the measured relevance, or some combination thereof into the statistical classification model. The vulnerability module 116 may train at least a portion of the statistical classification model on the input to identify one or more features of the modelling data 100. The features may include a portion or characteristic of the modelling data 100 that indicates a threat level posed by the application vulnerabilities. The vulnerability module 116 may apply a mathematic model to classified modelling data to calculate derived threat levels.

The vulnerability module 116 may compare the derived threat levels. In response to the derived threat levels differing by more than a threshold amount (e.g., 10%), the vulnerability module 116 may output the derived threat levels as the threat levels to a network management system 111 or another suitable system. In response to the derived threat levels differing by less than the threshold amount, the vulnerability module 116 may acquire environmental data. The vulnerability module 116 may analyze the environmental data to derive one or more additional features and reclassifying the modelling data 100 based on the additional features. Based on the analysis including the additional features, the vulnerability module 116 may generate a reclassified threat levels. The vulnerability module 116 may output the reclassified threat levels the threat levels to the network management system 111.

The vulnerability module 116 may cause display of the threat levels or data representative thereof in the network management system 111. Display of the threat levels may enable evaluation of the application vulnerabilities. The vulnerability module 116 may cause the network management system 111 to implement a mitigation action. For instance, the network management system 111 may implement, at the endpoint device 106 of the managed network 110, a patch to address one of the application vulnerabilities.

Additionally or alternatively, the vulnerability module 116 may be configured for vulnerability assessment as described with reference to FIG. 2 and the operations described with reference FIGS. 5A-6.

Modifications, additions, or omissions may be made to the operating environment 151 without departing from the scope of the present disclosure. For example, the operating environment 151 may include one or more managed networks 110, one or more management devices 102, one or more endpoint device 106, one or more data sources 104 or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
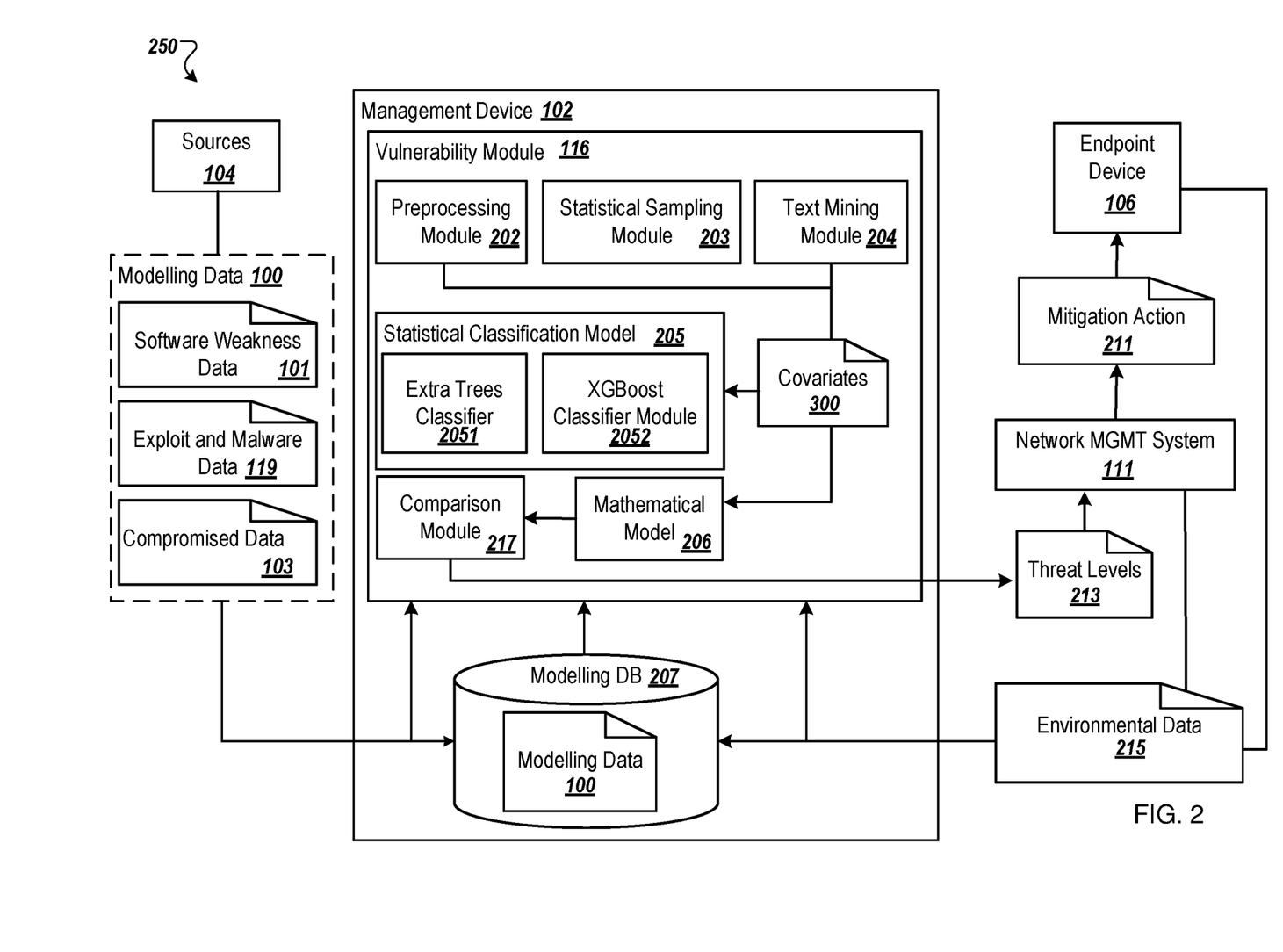
FIG. 2 illustrates an example application vulnerability assessment and prioritization process (vulnerability assessment process) that may be implemented in the operating environment of FIG. 1.

FIG. 2 illustrates an example application vulnerability assessment and prioritization process (vulnerability assessment process) 250 that may be implemented in the operating environment 151 of FIG. 1 or another suitable operating environment. The vulnerability assessment process 250 may be implemented to determine a threat level of two or more application vulnerabilities. From determined threat levels, a system or network can compare and prioritize one mitigation action ahead of another. For instance, a first vulnerability may have a critical threat level and a second vulnerability may have a low threat level. Accordingly, a network subject to the first vulnerability and the second vulnerability may prioritize a first mitigation action to address the first vulnerability over a second mitigation action to address the second vulnerability.

The vulnerability assessment process 250 is implemented to generate threat levels 213. The threat levels 213 may include a quantification of a severity of a threat posed by a vulnerability. The quantification may be a rating (e.g., critical, important, high, medium, low, info., and the like) or the quantification may be a score such as a 5 out of 10, a percentage (e.g., a score out of a possible 100), etc. The vulnerability assessment process 250 is further implemented to enable prioritization of two or more vulnerabilities relative to one another. For instance, a first vulnerability having a higher threat level may be prioritized over a second vulnerability having a relatively lower threat level. Decisions regarding resource allocation in a managed network (e.g., 110 of FIG. 1) may be based on the prioritization. Moreover, mitigation actions 211 may be automatically implemented based at least partially on the threat levels 213.

The vulnerability assessment process 250 may begin by the management device 102 ingesting the modelling data 100. The management device 102 may ingest the modelling data 100 from the sources 104. The modelling data 100 may include an aggregation of one or more types of data such as software weakness data 101, exploit and malware data 119, compromised data 103, and other suitable types of data related to vulnerabilities or networks implementing the vulnerabilities.

The modelling data 100 may be ingested from the sources 104. The sources 104 may include open, commercial, private sources, or combinations thereof. For instance, the sources 104 may include public websites such as https://owasp.org/ on which the OWASP® Top 10 may be found, https://cve.mitre.org/ on which the CVE information may be found, and the like. Additionally or alternatively, the sources 104 may include private or product-specific websites such as https://msrc.microsoft.com/update-guide on which updates related to some MICROSOFT® products may be found. Additionally still, the sources may include proprietary sources that review vulnerabilities and generate patches and/or patch packages to address the vulnerabilities.

The modelling data 100 may include one or more text-based files such as white papers, internet pages, tables of information, programming code or portions thereof, and the like. For instance, the modelling data 100 might include portions of program files and descriptive text related to the application vulnerabilities.

The software weakness data 101 may include any program code related to or description of a software application vulnerability. The software weakness data 101 might relate to causes, remedies, symptomology, susceptible applications, and the like. The software weakness data 101 may relate to software application vulnerabilities such as injections, cross-site scripting, local or remote code execution, privilege escalation, unauthorized reading, unintentional reading, unauthorized modification, unintentional modification of data, unintentional instructions of the application, other vulnerabilities, or combinations thereof.

These software application vulnerabilities can have additional features mapped to them by public taxonomies and widespread scoring systems. These scoring systems can include, for example, common vulnerability scoring system ("CVSS"), common weakness enumeration ("CWE"), the CWE Top 25 or OWASP Top 10, which are available to the public. The software weakness data 101 may include data related to the features.

In some embodiments, the vulnerability module 116 may implement an application scanner to collect the software weakness data 101. Some examples of an application scanner implemented by the vulnerability module 116 may include a static application security testing ("SAST"), dynamic application security testing ("DAST"), open-source security ("OSS"), or container scanning. The SAST is a white box testing method that analyzes the source code to identify application weaknesses. The DAST is a black box testing method which can identify application vulnerabilities at runtime. The OSS involves security checks within an application throughout development to ensure an organization complies with open-source licenses. Container scanning includes validating security measures at all stages of the software development life cycle ("SDLC").

The exploit and malware data 119 may include any program that uses one or more vulnerabilities (e.g., those listed in the foregoing paragraphs) to cause unauthorized manipulation of an application. The unauthorized manipulation of an application may include local or remote code execution, privilege escalation, unauthorized or unintentional data reading, unauthorized or unintentional modification of data, unauthorized or unintentional instructions of the application, other unauthorized manipulation, or combinations thereof. The exploit and malware data 119 can be gathered from particular types of the sources 104 such as bug bounties, penetration testers, and other threat intelligence sources.

The compromised data 103 may include data related to an instance in which an exploit has been used against an application. For instance, the compromised data 103 may include data related to system failures caused by the exploit, signatures or communications related to the exploit, etc. The compromised data 103 may include information in the public domain such as open-source threat feeds in some embodiments. In some embodiments, the compromised data 103 may include proprietary information that is not known to the public.

The modelling data 100 may relate and organized according to a particular application vulnerability. For instance, a first portion of the compromised data 103, a first portion of the exploit and malware data 119, and a first portion of the software weakness data 101 may be related to a first application vulnerability and a second portion of the compromised data 103, a second portion of the exploit and malware data 119, and a second portion of the software weakness data 101 may be related to a second application vulnerability. The vulnerability module 116 may use the portion of the modelling data 100 related to the corresponding application vulnerability to determine a threat level.

The modelling data 100 may be stored at least temporarily in a modelling database 207 (in FIG. 2, "modelling DB" 207). The modelling database 207 may include one or more memory devices such as the memory 412 of FIG. 4. The modelling database 207 may be included in the management device 102 as depicted in FIG. 2 or may be implemented in a remote device such as a cloud server.

The modelling data 100 may be communicated to the vulnerability module 116. In the embodiment of FIG. 2, the vulnerability module 116 may include multiple modules configured for portions of the vulnerability assessment process 250. For instance, the vulnerability module 116 may include a preprocessing module 202, a statistical sampling module 203, a text mining module 204, a statistical classification model 205, a comparison module 217, and a mathematical model 206.

The preprocessing module 202 may receive the modelling data 100. The preprocessing module 202 may identify covariates 300 and transform the covariates 300 of the modelling data 100 into covariate vectors. The covariate vectors may be used as input to other portions or components of the vulnerability module 116.

For instance, the transformed modelling data 100 may input into the statistical sampling module 203. The statistical sampling module 203 may be configured to ensure that the models of the modelling data 100 generated by the vulnerability module 116 are robust to noise in the modelling data 100. The statistical sampling module 203 may accordingly improve the statistical accuracy of the model. The statistical sampling module 203 may implement stratified sampling, cluster sampling, and most frequent sampling, other statistical sampling techniques, or combinations thereof.

The text mining module 204 may be configured to extract keywords and phrases from the modelling data 100. The text mining module 204 may also be used the measure relevance of one or more files of the modelling data 100. The text mining module 204 may implement a text mining technique such as a term frequency-inverse document frequency ("TF-IDF") in some embodiments. Other suitable text mining techniques may also be implemented in the text mining module 204. Text feature extraction may help transform text extracted from the modelling data 100 into one or more feature vectors, which may be a potential input to the statistical classification model 205.

The statistical classification model 205 may implement statistical classification algorithms and/or decision trees learning. The statistical classification model 205 may identifying which set of categories a new observation belongs to, taking the modelling data 100 along with the output, considered a label, as input. Random decision forests, support vector machines, and/or neural networks are examples of statistical classification algorithms that may be implemented in the statistical classification model 205.

A portion of the output from the text mining module 204 may be input to the statistical classification model 205. For instance, the modelling data 100, the covariate 300 vectors, measured relevance, feature vectors, or some combination thereof may be input into the statistical classification model 205. At least a portion of the statistical classification model 205 may be trained on the input. The statistical classification model 205 may be trained to identify one or more features of the modelling data 100 indicative of a threat level posed by the application vulnerabilities.

In some embodiments, the statistical classification model 205 implements two or more classifiers. For example, in some embodiments, a first classifier of the statistical classification model 205 includes an extremely randomized trees classifier ("Extra Trees Classifier") 2051.

The extra trees classifier 2051 may be trained at least partially on the modelling data 100 and used to identify the most important features.

In these and other embodiments, a second classifier of the statistical classification model 205 includes an extreme gradient boosting ("XGBoost") classifier 2052. A refined dataset, which may include or only include the top identified features, may be used to train the XGBoost classifier 2052. The XGBoost classifier 2052 is a scalable gradient boosted decision tree implementation designed for computational speed and model performance. At least a portion of the output of the XGBoost classifier 2052 may be as input to the mathematical model 206. The mathematical model 206 may include an aggregation of decision trees, conditional logic, and one or more statistical calculations. The mathematical model 206 may calculate the derived threat levels.

The derived threat levels may be generated via the above process for multiple application vulnerabilities. The comparison module 217 may receive the derived threat levels and compare them. In response to the derived threat levels differing by more than a threshold amount, the vulnerability module 116 may output the derived threat levels as the threat levels 213 to the network management system 111. For instance, responsive to there being a sufficient difference between the derived threat levels for there to be a meaningful distinction being drawn between them, the derived threat levels may be used as the threat levels 213. Accordingly, the derived threat levels may be used to prioritize mitigation actions 211 implemented at the endpoint device 106 or by the network management system 111.

In response to the derived threat levels being within the threshold amount relative to one another, an additional analysis may be implemented that includes the environmental data 215. For instance, responsive to there being insufficient difference between the derived threat levels, at least a portion of the analysis above may be repeated for the modelling data 100 and the environmental data 215. The subsequent analysis may enable application of features and parameters specific to the endpoint device 106 or the network management system 111, which may enable prioritization of the mitigation actions 211.

In some embodiments, the vulnerability module 116 may acquire the environmental data 215. The environmental data 215 may include characteristics or properties of a managed network (e.g., managed network 110) implementing a software application affected by the software application vulnerability, of the endpoint device 106, of the network management system 111, or other characteristics or properties of the managed network.

The vulnerability module 116 may analyzing the environmental data 215 to derive one or more additional features related to the computer network according to the vulnerability assessment process 250 described above. For instance, the statistical classification model 205 and the mathematical model 206 may reclassify the modelling data 100 based at least partially on the additional features to generate reclassified threat levels. The reclassified threat levels may be output as the threat levels 213 to the network management system 111. The threat levels 213 may be displayed at the network management system 111 or the management device 102, which may enable evaluation of the application vulnerabilities. Additionally or alternatively, one or more of the mitigation actions 211 may be implemented based on the threat levels 213.

In some embodiments, the threat levels 213 may be calculated using the environmental data 215 initially instead of or in addition to implementation of the operations of the comparison module 217.

Figure 3:
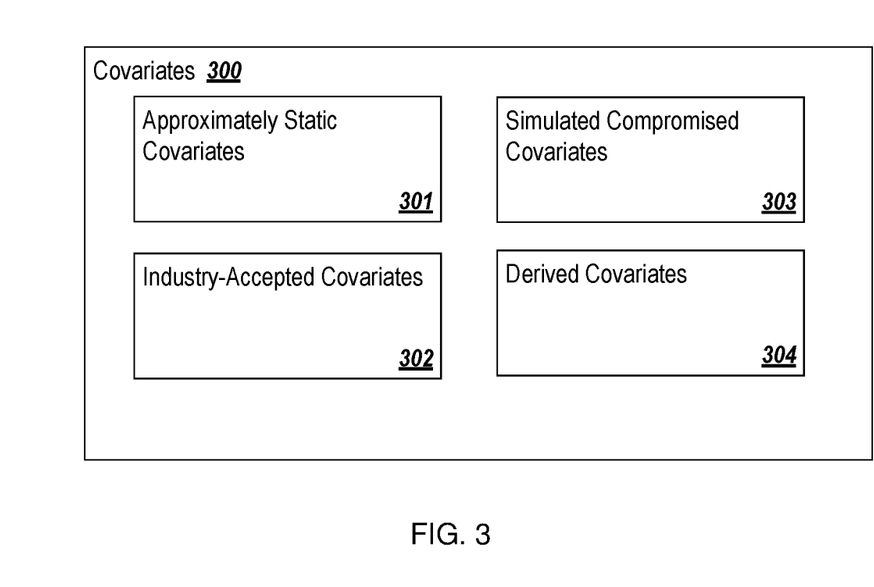
FIG. 3 illustrates example covariates that may be implemented in the operating environment of FIG. 1 and/or the vulnerability assessment process of FIG. 2.

FIG. 3 illustrates example covariates 300 that may be implemented in the operating environment 151 of FIG. 1 and/or the vulnerability assessment process 250 of FIG. 2 or another suitable operating system or process. The covariates 300 may be used as input to the vulnerability module 116 or some portion thereof described elsewhere in the present disclosure. For example, the covariates 300 may be functionally represented in covariate vectors. Additionally or alternatively, the covariates 300 may be an input to a mathematical model such as the statistical classification model 205 and/or the mathematical model 206 of FIG. 2.

In general, a covariate is an independent variable that can influence a result or may be predictive to an outcome. In the context of the present disclosure, a threat level of one or more application vulnerabilities is a dependent variable or desired result. Accordingly, the covariates 300 include parameters or characteristics of a particular application vulnerability or an environment in which the vulnerability exists that may be affect the threat level posed by the particular application vulnerability. Additionally, the covariates 300 may be used to compare a threat level of the particular application vulnerability relative to one or mor other application vulnerabilities. To enable an evaluation of two or more application vulnerabilities relative to one another, the covariates 300 may be normalized or accounted for to enable comparison and classification.

The covariates 300 might include multiple types. For example, the covariates 300 may include approximately static covariates 301, industry accepted covariates 302, simulated compromise covariates 303, and derived covariates 304. Each of these are described in the following paragraphs.

The approximately static covariates 301 include information that stays relatively the same once recorded. For instance, if the information of the approximately static covariates 301 changes, it changes gradually over a long period of time (e.g., months or years). For instance, the OWASP Top 10 may be an example of the approximately static covariates 301. The OWASP Top 10 is a list that is updated every three to four years. Similarly, CVSS may be an example of the approximately static covariates 301. The CVSS 2.0 was adopted in 2007, CVSS 3.0 was adopted in 2015, and most recently CVSS 3.1 was adopted in 2019. Again, the approximately static covariates 301 may change, but do so over a long period of time and through iterations that span over years. Some examples of approximately static covariates 301 include the OWASP Top 10, CWE, CVE, and/or CVSS attack vectors. Encoding for approximately static covariates 301 in the vulnerability module 116 might include categorical, real valued, and/or integer valued.

The industry-accepted covariates 302 may include documents or information recognized by the cybersecurity industry as standard awareness and knowledge for software developers and application security analysts. Examples of the industry-accepted covariates 302 may include the OWASP Top 10, the CWE, the SysAdmin, audit network and security ("SANS") Top 25 Most Dangerous Software Errors other cybersecurity industry standards or combinations thereof.

The simulated compromise covariates 303 can include the use of exploits, malware, and/or a combination of cyber weapons against a vulnerability in an organization's application. These simulated compromise covariates 303 may be verified by a human analyst, but can be successfully carried out by humans and/or an automated script. Deployment of simulated compromise covariates 303 can be used to produce derived covariates 304.

The derived covariates 304 may be generated as a byproduct of one or more statistical operations of the vulnerability module 116. For instance, the derived covariates 304 may be combinations of covariates, intermediate calculations of the vulnerability module 116, and the like. The derived covariates 304 may be used as input to one or more subsequent statistical operations of the vulnerability module 116. For instance, a first derived covariates 304 may be generated using the statistical classification model 205 for a particular software weakness data 101. The first derived covariates 304 may then be used as input for the mathematical model 206. Derived covariates 304 can also be used to produce additional derived covariates 304.

Figure 4:
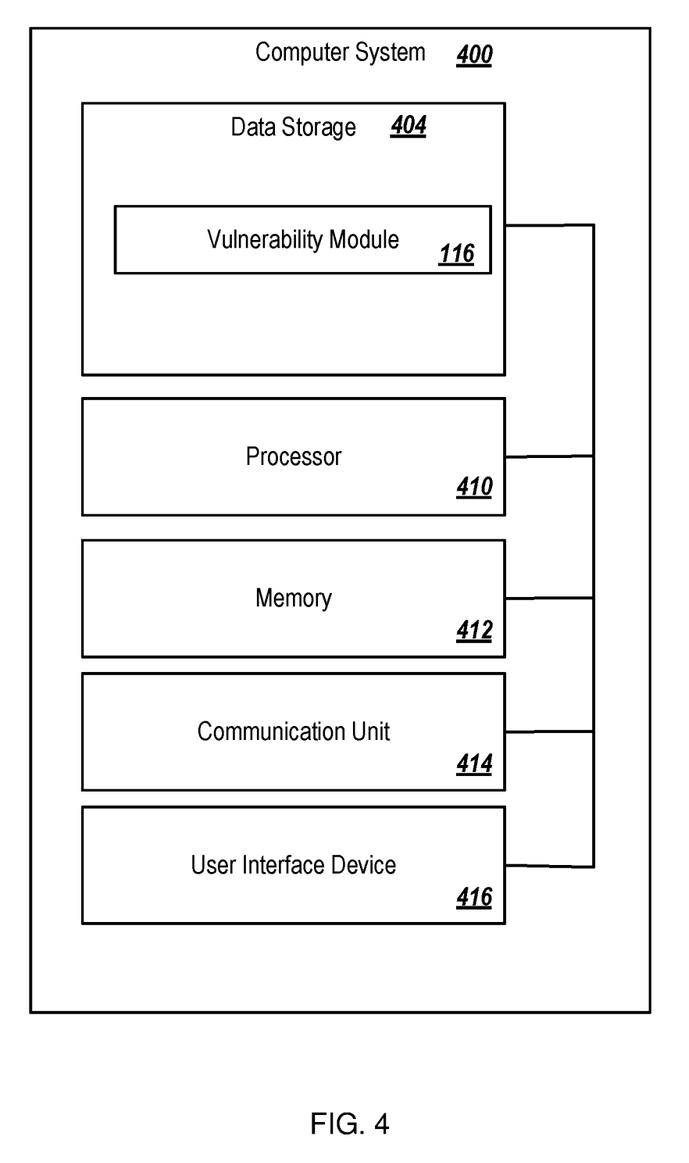
FIG. 4 illustrates an example computer system configured for vulnerability assessment and prioritization.

FIG. 4 illustrates an example computer system 400 configured for vulnerability assessment and prioritization according to at least one embodiment of the present disclosure. The computer system 400 may be implemented in the operating environment 151 FIG. 1, for instance. Examples of the computer system 400 may include the management device 102, the endpoint device 106, the sources 104, the network management system 111, or some combination thereof. The computer system 400 may include one or more processors 410, a memory 412, a communication unit 414, a user interface device 416, and a data storage 404 that includes the vulnerability module 116.

The processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 4, the processor 410 may more generally include any number of processors configured to perform individually or collectively any number of operations described in the present disclosure. Additionally, one or more of the processors 410 may be present on one or more different electronic devices or computing systems. In some embodiments, the processor 410 may interpret and/or execute program instructions and/or process data stored in the memory 412, the data storage 404, or the memory 412 and the data storage 404. In some embodiments, the processor 410 may fetch program instructions from the data storage 404 and load the program instructions in the memory 412. After the program instructions are loaded into the memory 412, the processor 410 may execute the program instructions.

The memory 412 and the data storage 404 may include computer-readable storage media for carrying or having computer-executable instructions or data structures stored thereon. Such computer-readable storage media may include any available media that may be accessed by a general-purpose or special-purpose computer, such as the processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 414 may include one or more pieces of hardware configured to receive and send communications. In some embodiments, the communication unit 414 may include one or more of an antenna, a wired port, and modulation/demodulation hardware, among other communication hardware devices. In particular, the communication unit 414 may be configured to receive a communication from outside the computer system 400 and to present the communication to the processor 410 or to send a communication from the processor 410 to another device or network (e.g., the network 120 of FIG. 1).

The user interface device 416 may include one or more pieces of hardware configured to receive input from and/or provide output to a user. In some embodiments, the user interface device 416 may include one or more of a speaker, a microphone, a display, a keyboard, a touch screen, or a holographic projection, among other hardware devices.

The vulnerability module 116 may include program instructions stored in the data storage 404. The processor 410 may be configured to load the vulnerability module 116 into the memory 412 and execute the vulnerability module 116. Alternatively, the processor 410 may execute the vulnerability module 116 line-by-line from the data storage 404 without loading them into the memory 412. When executing the vulnerability module 116, the processor 410 may be configured to perform one or more processes or operations described elsewhere in this disclosure.

Modifications, additions, or omissions may be made to the computer system 400 without departing from the scope of the present disclosure. For example, in some embodiments, the computer system 400 may not include the user interface device 416. In some embodiments, the different components of the computer system 400 may be physically separate and may be communicatively coupled via any suitable mechanism. For example, the data storage 404 may be part of a storage device that is separate from a device, which includes the processor 410, the memory 412, and the communication unit 414, that is communicatively coupled to the storage device. The embodiments described herein may include the use of a special-purpose or general-purpose computer including various computer hardware or software modules, as discussed in greater detail below.

Figure 5A:
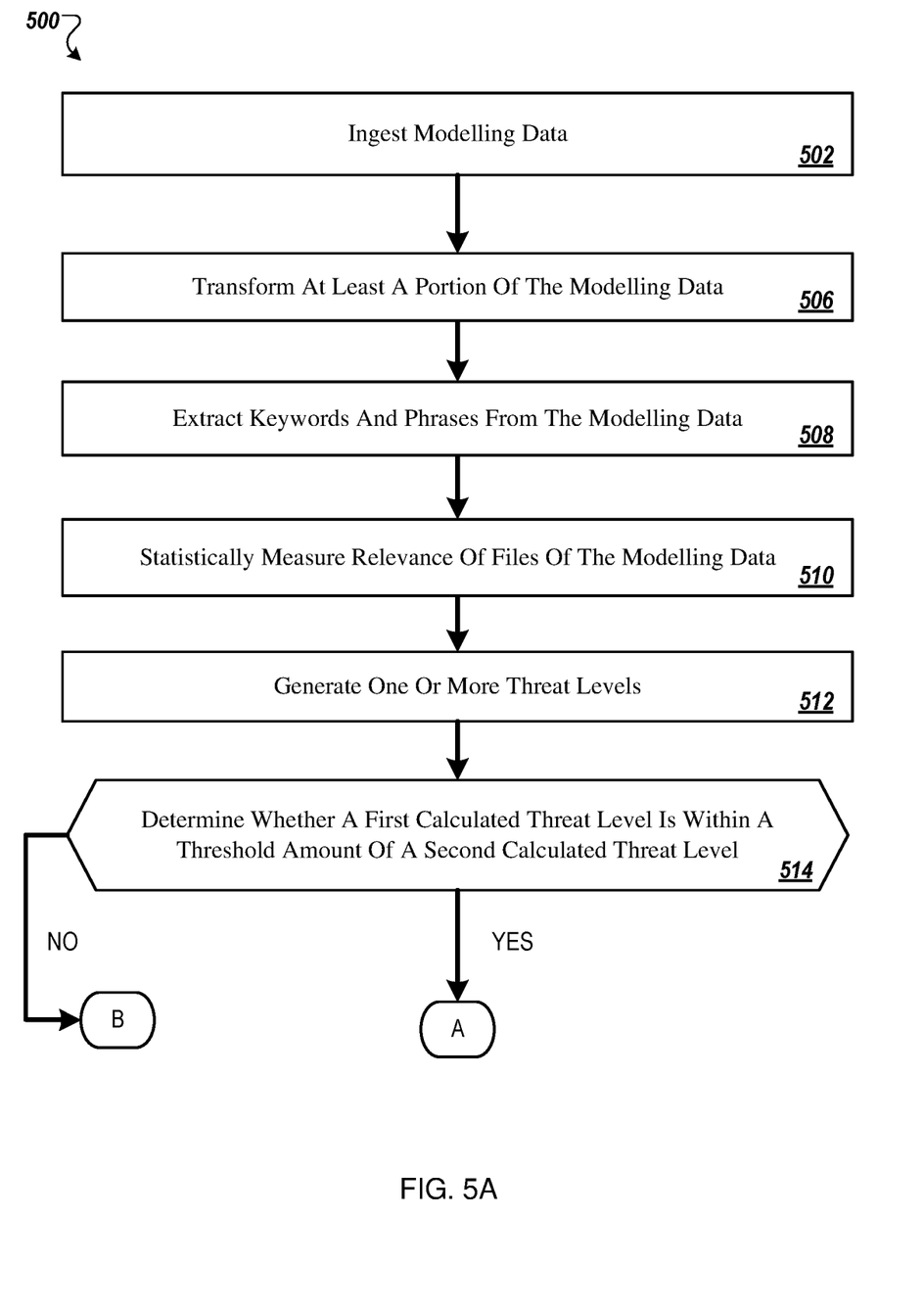
FIGS. 5A and 5B are a flow chart of an example method of application vulnerability assessment and prioritization.
Figure 5B:
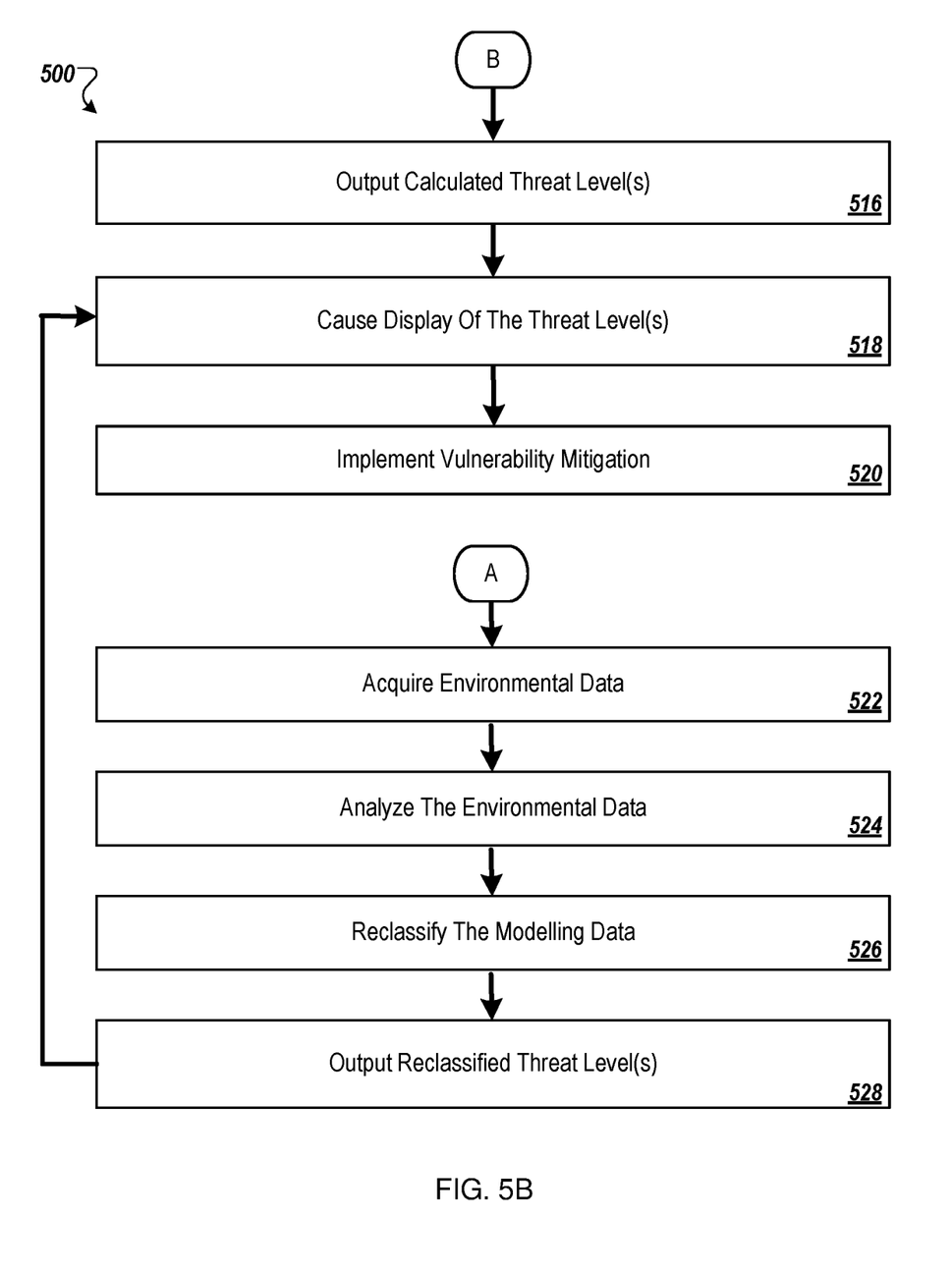

FIGS. 5A and 5B are a flow chart of an example method 500 of application vulnerability assessment and prioritization, according to at least one embodiment of the present disclosure. Although illustrated as discrete blocks, one or more blocks in FIGS. 5A and 5B may be divided into additional blocks, combined into fewer blocks, or eliminated, depending on the desired implementation. Referring to FIG. 5A, the method 500 may begin at block 502 in which modelling data may be ingested. The modelling data may be ingested from two or more sources for multiple application vulnerabilities such as a first application vulnerability and a second application vulnerability.

For instance, in an example embodiment, the first application vulnerability is associated with a first software application and the second application vulnerability is associated with a second software application. In this example embodiment, a first endpoint device implemented in a managed network may include the first and the second software applications.

Ingestion of the modelling data may be an ongoing process. For instance, a system implementing the method 600 may periodically or continuously access the modelling data. In some embodiments, the two or more data sources may include public sites, private sites, sites in which proprietary data is stored, generated, or aggregated.

In some embodiments, the modelling data includes one or more or a combination of software weakness data, exploit data, and compromised data. Some details of the modelling data are provided elsewhere in the present disclosure. In these and other embodiments, the modelling data includes one or more text-based files that might include portions of program files (e.g., suggested patches or vulnerability solutions) and/or descriptive text (e.g., descriptive information such as tables of affected application, threat ratings, malicious party discussions, social media posts, symptom descriptions, and the like) related to the first and second application vulnerabilities.

At block 502, at least a portion of the modelling data may be transformed. For instance, at least a portion of the modelling data may be transformed into one or more covariate vectors, which may be representative of one or more parameters of the modelling data. In some embodiments, the covariate vectors may include an approximately static covariate, an industry-accepted covariate, a simulated compromise covariant, a derived covariate, other covariates, or combinations thereof.

At block 504, keywords and phrases may be extracted from the modelling data. In some embodiments, the extracting the keywords and phrases from the modelling data is performed using a term frequency-inverse document frequency (TF-IDF) vectorizer. At block 506, relevance of files or portions of the modelling data may be statistically measured. The relevance may be statistically measured based at least partially on the extracted keywords and phrases.

At block 512, one or more threat levels may be generated. For instance, a first threat level of the first application vulnerability and a second threat level of the second application vulnerability may be generated. In some embodiments, the threat levels may be generated based on the covariate vectors and the measured relevance. In some embodiments, generation of the one or more threat levels may include calculation of a first derived threat level and a second derived threat level, which may be based solely on the modelling data instead of the modelling data and environmental data. At block 514, it may be determined whether a first derived threat level is within a particular threshold amount of a second derived threat level. In some embodiments, the threat levels may be quantified on a scale of 1 thru 10 (with 10 being a critical threat). In these and other embodiments, the particular threshold amount may be 0.1, 0.2, 0.5, or another suitable threshold.

In response to the first derived threat level being within the threshold amount of the second derived threat level ("YES" at block 514), the method 500 may proceed to block 522 of FIG. 5B. In response to the first derived threat level not being within the threshold amount of the second derived threat level ("NO" at block 514), the method 500 may proceed to block 516 of FIG. 5B.

Referring to FIG. 5B, at block 516, derived threat levels may be output. For instance, the derived threat levels may be output as threat levels for one or more application vulnerabilities. For instance, the first derived threat level may be output as the first threat level and the second derived threat level may be output as the second threat level to a network management system. The derived threat levels may be output to one or more network management systems. For instance, the derived threat levels may be output to an ITSM application, a patch management system, a UEM or UEP system, or combinations thereof.

At block 518 display of the threat levels may be caused. The threat levels may be displayed or otherwise presented in one or more of the network management systems. Causing display of the threat levels in the network management system to enable evaluation of application vulnerabilities and prioritization thereof. At block 520, a vulnerability mitigation action may be implemented. For instance, the vulnerability mitigation action may include implementing, at a first endpoint device of the network, a first patch to address the first application vulnerability. Other vulnerability mitigation actions may include generating a ticket in an ITSM system, displaying vulnerability priority information, and the like.

At block 522, environmental data may be acquired. The environmental data may be related to a computer network implementing the method 500. For instance, the environmental data may be implemented by a software application affected by the software application vulnerability. At block 524, the environmental data may be analyzed. The environmental data may be analyzed to derive one or more additional features related to the computer network. At block 526, the modelling data may be reclassified based on the additional features. The modelling data may be reclassified to generate a first reclassified threat level and a second reclassified threat level. At block 528, reclassified threat levels may be output. For instance, a first reclassified threat level may be output as the first threat level and the second reclassified threat level may be output as the second threat level to one or more of the network management systems as described above. The method 500 may proceed from block 528 to one or both of block 518 and 520 as described above.

Figure 6:
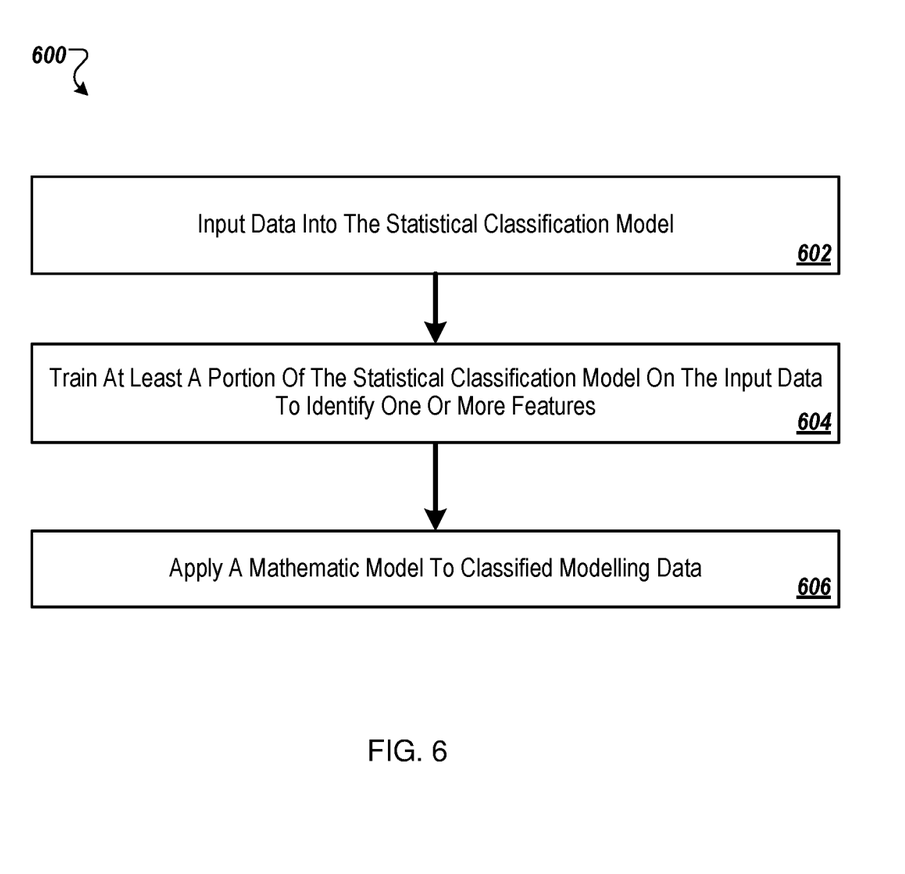
FIG. 6 is a flow chart of an example method of threat level generation, all in accordance with at least one embodiment of the present disclosure.

FIG. 6 is a flow chart of an example method 600 of threat level generation, according to at least one embodiment of the present disclosure. The method 600 may be implemented in another method such as the method 500 described above. For instance, the method 600 or portions thereof may be implemented in one or both of blocks 512 and 526 of the method 500. Although illustrated as discrete blocks, one or more blocks in FIG. 6 may be divided into additional blocks, combined into fewer blocks, or eliminated, depending on the desired implementation.

The method 600 may begin at block 602 in which data may be input into a statistical classification model. In some embodiments, the data input into the statistical classification model may include modelling data, covariate vectors, and measured relevance. For instance, when implemented in block 512 of FIG. 5A, the data input into the statistical classification model may include the modelling data of block 502, covariate vectors of block 506, measured relevance of block 510, other input data, or combinations thereof. Additionally or alternatively, when implemented in block 526 of FIG. 5B, the data input into the statistical classification model may include the modelling data of block 502, covariate vectors of block 506, measured relevance of block 510, the environmental data of 522, other input data, or combinations thereof.

At block 604, at least a portion of the statistical classification model may be trained using the input data. The training of the statistical classification model may be performed to identify one or more features. The one or more features may include parameters or elements of the modelling data indicative of a threat level posed by one or more application vulnerabilities. For instance, the features may include CVE scores, CWE scores, etc. In some embodiments, the statistical classification model implements two or more classifiers. For instance, a first classifier of the statistical classification model may include an extra trees classifier and a second classifier of the statistical classification model includes an XGBoost classifier. In these and other embodiments, the extra trees classifier may be trained based on the modelling data, the covariate vectors, and measured relevance to identify the one or more features. The XGBoost classifier may then be trained on a dataset that includes or only includes the one or more features.

At block 606, a mathematic model may be applied to classified input data such as classified modelling data. The mathematic model may be applied to calculate derived threat levels such as a first derived threat level and a second derived threat level and/or to reclassified threat levels such as a first reclassified threat level and a second reclassified threat level. Additionally, in some embodiments, classified modelling data and the covariate vectors may be input to the mathematical model. Additionally still, the mathematical model may include one or both of an aggregation of decision trees and conditional logic.

The methods 500 and 600 may be performed in a suitable operating environment such as the operating environment 151 or the managed network 110 of FIG. 1. The methods 500 and 600 may be performed by the management device 102 described elsewhere in the present disclosure or by another suitable computing system, such as the computer system 400 of FIG. 4. In some embodiments, the management device 102 or the other computing system may include or may be communicatively coupled to a non-transitory computer-readable medium (e.g., the memory 412 of FIG. 4) having stored thereon programming code or instructions that are executable by one or more processors (such as the processor 410 of FIG. 4) to cause a computing system or the management device 102 to perform or control performance of the methods 500 and 600. Additionally or alternatively, the management device 102 may include the processor 410 that is configured to execute computer instructions to cause the management device 102 or another computing systems to perform or control performance of the methods 500 and 600. The management device 102 or the computer system 400 implementing the methods 500 and 600 may be included in a cloud-based managed network, an on-premises system, or another suitable network computing environment.

Further, modifications, additions, or omissions may be made to the methods 500 and 600 without departing from the scope of the present disclosure. For example, the operations of method 500 and 600 may be implemented in differing order. Furthermore, the outlined operations and actions are only provided as examples, and some of the operations and actions may be optional, combined into fewer operations and actions, or expanded into additional operations and actions without detracting from the disclosed embodiments.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

Optionally, embodiments of the present invention can be performed via one or more computers operating on software and can include a general or specific purpose computer or distributed system programmed with computer software implementing steps described above, which computer software may be in any appropriate computer language, including but not limited to C, C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Note that in the specification and claims, "about" or "approximately" means within twenty percent (20%) of the amount or value given. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of application vulnerability assessment and prioritization, the method comprising:
    ingesting modelling data from two or more data sources for a first application vulnerability and a second application vulnerability;
    transforming at least a portion of the modelling data to one or more covariate vectors representative of a parameter of the modelling data;
    extracting keywords and phrases from the modelling data;
    statistically measuring relevance of files of the modelling data based on the extracted keywords and phrases;
    generating a first threat level of the first application vulnerability and a second threat level of the second application vulnerability based on the covariate vectors and the measured relevance, wherein the generating includes:
        inputting the modelling data, the covariate vectors, and measured relevance into the statistical classification model,
        training at least a portion of the statistical classification model on the input to identify one or more features of the modelling data that indicate a threat level posed by the first and the second application vulnerability, and
        applying a mathematic model to classified modelling data to calculate a first derived threat level and a second derived threat level;
    in response to the first derived threat level differing by more than a threshold amount from the second derived threat level, outputting the first derived threat level as the first threat level and the second derived threat level as the second threat level to a network management system;
    causing display of the first threat level and the second threat level in the network management system to enable evaluation of the first application vulnerability and the second first application vulnerability; and
    implementing, at a first endpoint device of the network, a first patch to address the first application vulnerability.

2. The method of claim 1, wherein the modelling data includes one or more or a combination of software weakness data, exploit data, and compromised data.

3. The method of claim 1, wherein the extracting the keywords and phrases from the modelling data is performed using term frequency-inverse document frequency (TF-IDF) vectorizer.

4. The method of claim 1, wherein the statistical classification model implements two or more classifiers.

5. The method of claim 4, wherein a first classifier of the statistical classification model includes an extra trees classifier, and a second classifier of the statistical classification model includes an XGBoost classifier.

6. The method of claim 5, wherein:
    the extra trees classifier is trained based on the input to identify the one or more features; and
    the XGBoost classifier is trained on a dataset that only includes the one or more features.

7. The method of claim 1, wherein the modelling data includes one or more text-based files that include portions of program files and descriptive text related to the first application vulnerability and the second application vulnerability.

8. The method of claim 1, wherein the covariate vectors are representative of one or more or a combination of an approximately static covariate, an industry-accepted covariate, a simulated compromise covariant, and a derived covariate.

9. The method of claim 1, further comprising in response to the first derived threat level differing by less than a threshold amount from the second derived threat level:
    acquiring environmental data of a computer network implementing a software application affected by the software application vulnerability;
    analyzing the environmental data to derive one or more additional features;
    reclassifying the modelling data based on the one or more additional features to generate a first reclassified threat level and a second reclassified threat level; and
    outputting the first reclassified threat level as the first threat level and the second reclassified threat level as the second threat level to the network management system.

10. The method of claim 1, wherein the network management system includes a patch management system implemented to distribute patches in the network.

11. The method of claim 1, wherein:
    the covariate vectors are further input to the mathematical model; and
    the mathematical model includes one or both of an aggregation of decision trees and conditional logic.

12. The method of claim 1, wherein:
    the two or more data sources include a public site;
    the first application vulnerability is associated with a first software application;
    the second application vulnerability is associated with a second software application; and the first endpoint device is implemented in the network and includes the first and the second software applications.

13. A non-transitory computer-readable medium having encoded therein programming code executable by one or more processors to perform or control performance of operations of application vulnerability assessment and prioritization, the operations comprising:
   ingesting modelling data from two or more data sources for a first application vulnerability and a second application vulnerability;
   transforming at least a portion of the modelling data to one or more covariate vectors representative of a parameter of the modelling data;
   extracting keywords and phrases from the modelling data;
   statistically measuring relevance of files of the modelling data based on the extracted keywords and phrases;
   generating a first threat level of the first application vulnerability and a second threat level of the second application vulnerability based on the covariate vectors and the measured relevance, wherein the generating includes:
      inputting the modelling data, the covariate vectors, and measured relevance into the statistical classification model,
      training at least a portion of the statistical classification model on the input to identify one or more features of the modelling data that indicate a threat level posed by the first and the second application vulnerability, and
      applying a mathematic model to classified modelling data to calculate a first derived threat level and a second derived threat level;
   in response to the first derived threat level differing by more than a threshold amount from the second derived threat level, outputting the first derived threat level as the first threat level and the second derived threat level as the second threat level to a network management system;
   causing display of the first threat level and the second threat level in the network management system to enable evaluation of the first application vulnerability and the second first application vulnerability; and
   implementing, at a first endpoint device of the network, a first patch to address the first application vulnerability.

14. The non-transitory computer-readable medium of claim 13, wherein the modelling data includes one or more or a combination of software weakness data, exploit data, and compromised data.

15. The non-transitory computer-readable medium of claim 13, wherein the extracting the keywords and phrases from the modelling data is performed using term frequency-inverse document frequency (TF-IDF) vectorizer.

16. The non-transitory computer-readable medium of claim 13, wherein:
   the statistical classification model implements two or more classifiers;
   a first classifier of the statistical classification model includes an extra trees classifier; and
   a second classifier of the statistical classification model includes an XGBoost classifier.

17. The non-transitory computer-readable medium of claim 16, wherein:
   the extra trees classifier is trained based on the input to identify the one or more features; and
   the XGBoost classifier is trained on a dataset that only includes the one or more features.

18. The non-transitory computer-readable medium of claim 13, wherein the modelling data includes one or more text-based files that include portions of program files and descriptive text related to the first application vulnerability and the second application vulnerability.

19. The non-transitory computer-readable medium of claim 13, wherein the covariate vectors are representative of one or more or a combination of an approximately static covariate, an industry-accepted covariate, a simulated compromise covariant, and a derived covariate.

20. The non-transitory computer-readable medium of claim 13, wherein the operations further comprise:
   in response to the first derived threat level differing by less than a threshold amount from the second derived threat level:
      acquiring environmental data of a computer network implementing a software application affected by the software application vulnerability;
      analyzing the environmental data to derive one or more additional features;
      reclassifying the modelling data based on the one or more additional features to generate a first reclassified threat level and a second reclassified threat level; and
      outputting the first reclassified threat level as the first threat level and the second reclassified threat level as the second threat level to the network management system.

* * * * *